United States Patent [19]

Ehret et al.

[11] 4,077,424
[45] Mar. 7, 1978

[54] LIQUID DISTRIBUTOR VALVE ASSEMBLY

[75] Inventors: Gordon F. Ehret, Alhambra; William N. Rowley, Palos Verdes Estates; Robert R. Williams, San Dimas, all of Calif.

[73] Assignee: Wylain, Inc., Dallas, Tex.

[21] Appl. No.: 743,147

[22] Filed: Nov. 18, 1976

[51] Int. Cl.² .............................................. F16K 11/02
[52] U.S. Cl. ................................ 137/119; 137/624.14; 137/625.11
[58] Field of Search ............. 137/119, 624.13, 624.14, 137/625.11, 625.15, 625.46; 251/360, 362

[56] References Cited

U.S. PATENT DOCUMENTS

| | | | |
|---|---|---|---|
| 2,832,561 | 4/1958 | Holl | 137/625.46 X |
| 2,988,108 | 6/1961 | Malmquist et al. | 137/625.46 |
| 3,405,733 | 10/1968 | Hansen | 137/624.14 |

Primary Examiner—Robert G. Nilson
Attorney, Agent, or Firm—Lane, Aitken, Dunner & Ziems

[57] ABSTRACT

A liquid distributor valve assembly in which an impeller means is disposed in a housing and is rotatable in the housing by the force of liquid entering the housing. A valve assembly is adapted to rotate in the housing in a manner to selectively control the flow of fluid through a plurality of outlets, and a gear arrangement selectively rotates the valve means in response to rotation of the impeller means.

9 Claims, 7 Drawing Figures

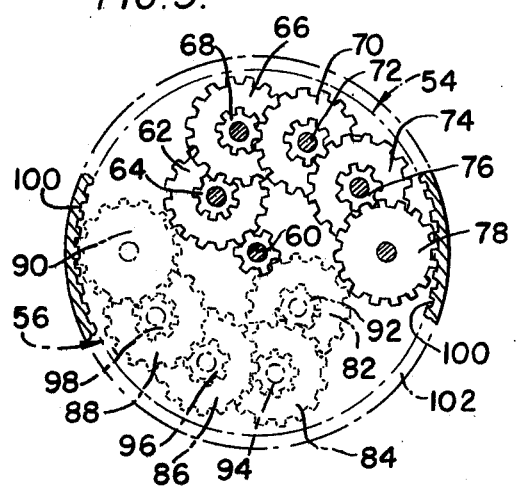
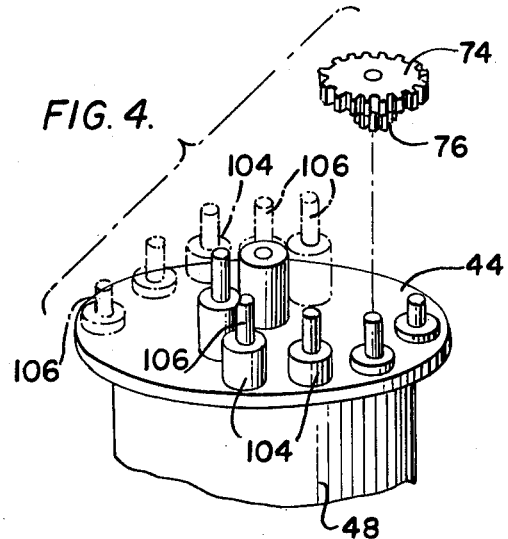
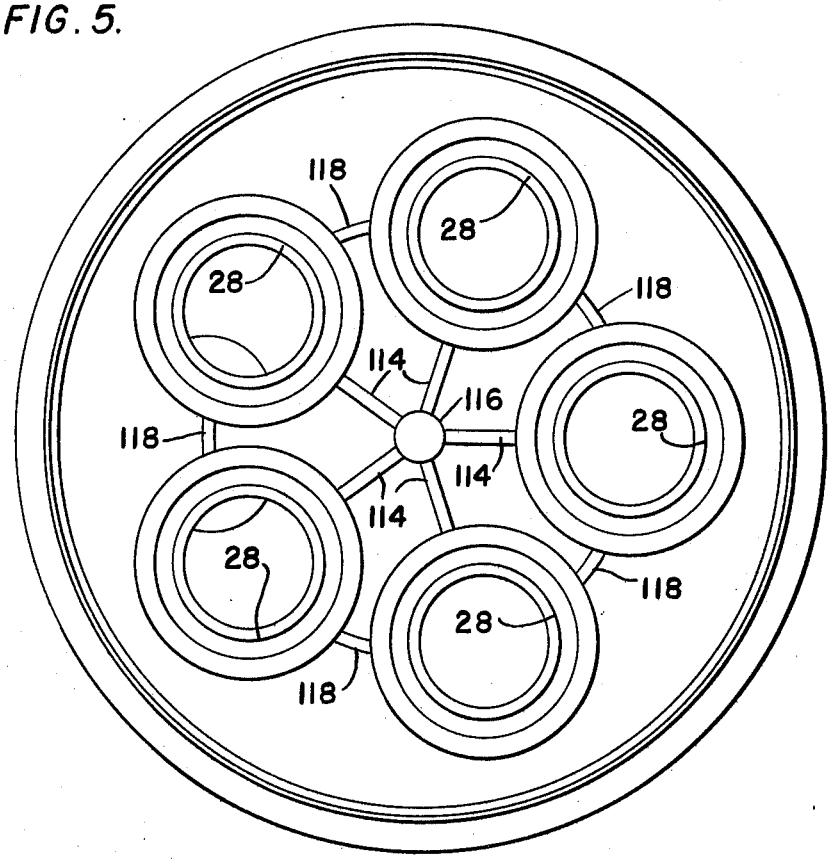

LIQUID DISTRIBUTOR VALVE ASSEMBLY

BACKGROUND OF THE INVENTION

This invention relates to a liquid distributor valve assembly and more particularly to such an assembly for successively directing liquid from a source to each of a plurality of delivery conduits.

Distributor assemblies for successively delivering water from a source to each of a plurality of delivery conduits for finite periods of time are well known. A typical example is such a distributor utilized in a pool cleaning system such as that disclosed in U.S. Pat. No. 3,506,489. In the arrangement disclosed in this patent water is pumped to the inlet of a distributor containing a plurality of exit openings and provided with means for successively opening one outlet at a time while keeping the other outlets closed. Delivery conduits lead from the respective outlets to different positions of the pool wall so that jets of water can be discharged to these individual positions for selected periods of time to sweep dirt off of the walls and into suspension in the pool water from which it can be collected for filtering. In many of these type arrangements, including the one disclosed in the above patent, a motor or the like has been required to operate the distributor for shifting the water flow from one outlet to the next.

In order to avoid the expense and maintenance problems associated with the use of a motor in this type of environment, it has also been suggested to pump water into an actuator housing and successively release it through a plurality of outlets by the use of pistons disposed at the outlets and arranged so that when the water is emitted within a piston past a ball valve the piston is pushed down to close the outlet. However, in these arrangements the piston and ball devices are relatively fragile, can become easily clogged, and are, therefore, unsuitable for reliable free operation for relatively long periods of time.

Still other arrangements to distribute fluid in the foregoing manner involve the use of a gear train located between a fluid actuated impeller and the valve member, usually in the form of a rotatable disc, to apply a relatively large torque to the valve member in proportion to the torque on the impeller, to insure that the rotation of the valve member will not be easily impeded. However, in these type arrangements the gear assembly, and especially the final gear-pinion unit is subjected to failure due to the high torque being transmitted between the impeller and the valve disc.

Also, in arrangements of the above type in which the valve is in the form of a disc that rotates relative to a plurality of outlets, the frictional contact between the disc and the valve seats associated with the outlets is relatively high. This tends to cause the valve disc to stop during its rotation and, in addition, creates relatively high wear on the disc and the seats.

SUMMARY OF THE INVENTION

It is, therefore, an object of the present invention to provide a liquid distributor valve for successively directing the flow of liquid from a pressurized source to a plurality of delivery outlets.

It is a further object of the present invention to provide an assembly of the above type which eliminates the use of a motor or a piston-ball arrangement.

It is a still further object of the present invention to provide an assembly of the above type in which two mutually independent gear systems drive a disc valve in response to rotation of a fluid actuated impeller to successively open the outlets.

It is a still further object of the present invention to provide an assembly of the above type in which the outlets are provided with valve seats designed to minimize their frictional contact with the rotatable valve disc.

It is a still further object of the present invention to provide an assembly of the above type which is relatively simple in construction and operation and reliable over relatively long periods of time.

Toward the fulfillment of these and other objects, the assembly of the present invention comprises a housing having an inlet for receiving liquid from a source, a plurality of outlets adapted for connection to delivery conduits, and a chamber communicating said inlet and said outlets. An impeller is disposed in the chamber in the path of the liquid entering the housing through the inlet, with the impeller being rotatable in the housing by the force of the liquid. A rotatable disc valve is disposed in said chamber, is adapted to block the flow of fluid through the outlets, and has at least one opening extending therethrough which is adapted to seccessively register with said outlets upon rotation of said valve to permit the flow of fluid through said outlets. A gear system operatively connects the impeller and the valve for rotating the valve in response to the rotation of said impeller.

BRIEF DESCRIPTION OF THE DRAWINGS

FIG. 3 is a bottom plan view of a component of the assembly of FIGS. 1 and 2;

FIG. 4 is a partial exploded, perspective view of several components of the assembly of FIGS. 1 and 2;

FIG. 5 is a bottom plan view of the assembly of FIGS. 1 and 2; and

DESCRIPTION OF THE PREFERRED EMBODIMENTS

Figure 1:
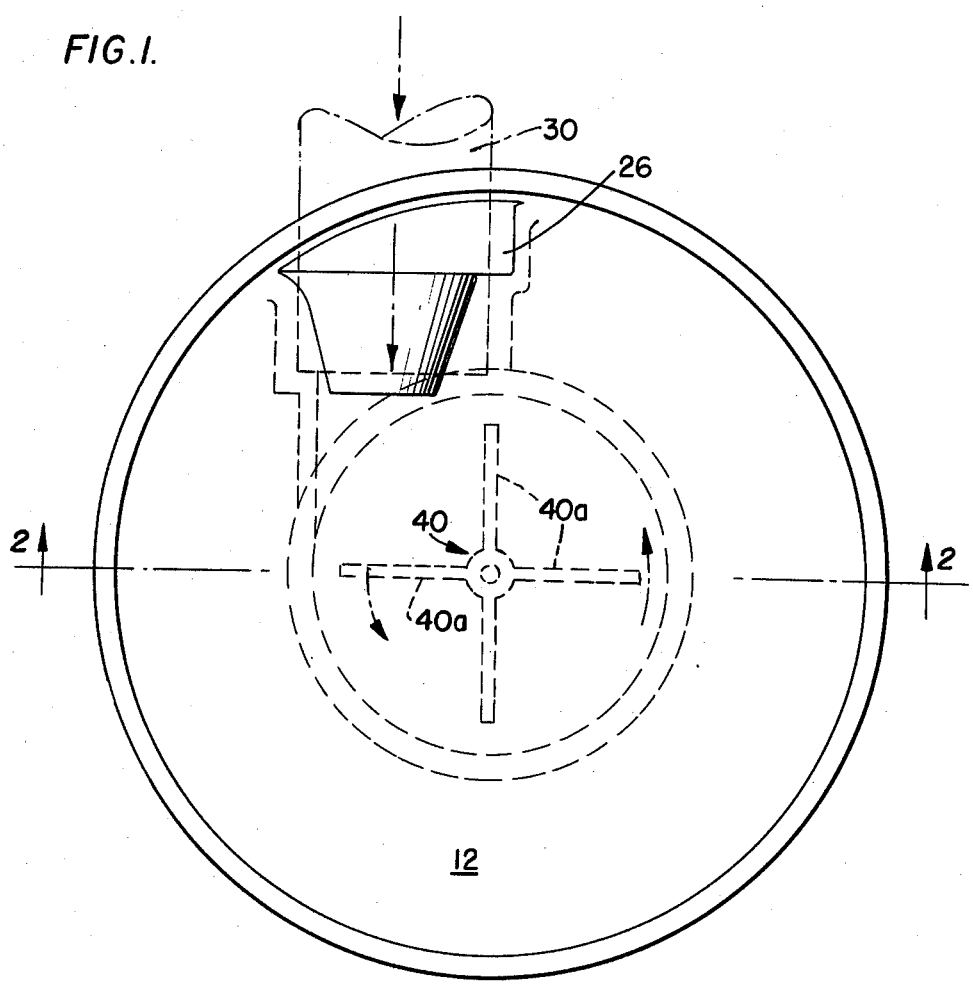
FIG. 1 is a top plan view of the distributor valve assembly of the present invention.
Figure 2:
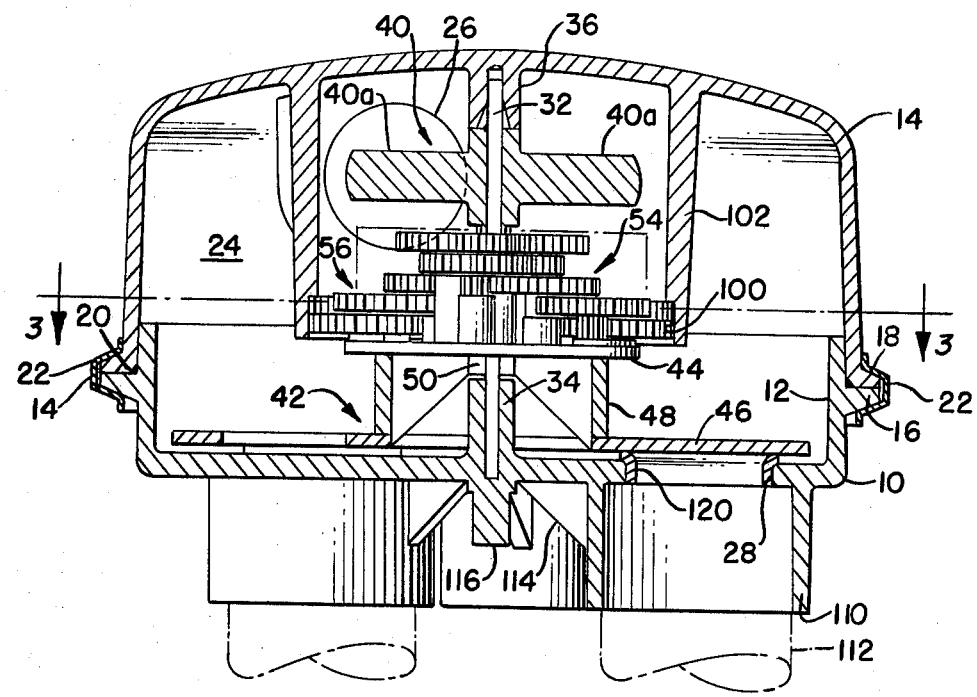
FIGS. 2 and 6 are cross-sectional views taken along the lines 2—2 and 6—6 of FIGS. 1 and 2, respectively.

Referring to FIGS. 1 and 2 of the drawings, the liquid distributor valve assembly consists of a housing defined by a base 10 having the general form of a flat circular disc with a raised circumferential side portion 12 over which is fitted an upper dome portion 14. Circumferentially extending flanges 16 and 18 extend from the outer surfaces of the side portion 12 of the base member 10 and the dome portion 14, respectively, and extend in abutting relationship. A circular seal ring 20 extends at an interface between the flange portions 16 and 18, and the base 10 and the dome 14 are fastened together by a U-clamp 22 extending around the abutting flanges 16 and 18. The base 10 and the dome 14 define an interior chamber, shown in general by the reference numeral 24, which communicates an inlet 26 formed in a side wall of the dome 14 and a plurality of outlets, one of which is shown by the reference numeral 28 in FIG. 2, formed in the base member 10.

As shown in FIG. 1, a conduit 30 may be secured relative to the inlet 26 in any conventional manner to introduce liquid, usually water, into the chamber 24.

A centrally located vertical spindle 32 extends within the housing and is journaled at its respective end portions within a pair of bosses 34 and 36 extending from and formed integral with the base member 10 and the dome 14, respectively. An impeller 40 is fixed to the spindle 32 for rotation therewith and has four paddles 40a extending at 90° intervals within the chamber 24.

A valve assembly, shown in general by the reference numeral 42, is provided in the chamber 24 and includes a platform 44, a valve disc 46 extending immediately over the outlets 28, and a cylindrical member 48 connecting the platform to the disc.

A bushing member 50 is affixed to the lower surface of the platform 44 and extends over the spindle 32 for free rotation relative thereto. The platform 44 and the valve disc 46 have central openings through which extends the spindle 32 and the boss 34, respectively, to permit rotation of the platform and, therefore, the disc relative to the spindle 32.

Two mutually independent gear assemblies shown in general by the reference numerals 54 and 56, respectively, are mounted relative to the platform 44 and operate to couple the spindle 32 to the platform so that the latter, and therefore the valve disc 46, will rotate in response to rotation of the impeller 40. The gear assemblies 54 and 56 are better dipicted in FIGS. 3 and 4 with the assembly 54 and its associated components being shown in solid lines, and the assembly 56 and its associated components being shown in dashed lines for the convenience of presentation. In particular, a central pinion 60 is fastened to the spindle 32 at a position just beneath the impeller 40 and is in meshing engagement with a gear 62 of the gear assembly 54. The gear 62 has a pinion 64, formed integral therewith or otherwise fastened thereto and extending from the lower surface thereof. The pinion 64 is in a meshing relationship with a gear 66 which, in turn, has a pinion 68 extending from its lower surface. The pinion 68 is in engagement with a gear 70 having a pinion 72 extending therefrom, which in turn is in meshing engagement with a gear 74 having a pinion 76 extending therefrom and in meshing engagement with a gear 78.

In a similar manner the gear assembly 56 includes a plurality of gears 82, 84, 86, 88 and 90. The gears 82, 84, 86 and 88 have pinions 92, 94, 96 and 98 extending from their lower surfaces with the pinion 92 driving the gear 84, the pinion 94 driving the gear 86, the pinion 96 driving the gear 88, and the pinion 98 driving the gear 90.

As better shown in FIG. 2, a ring gear 100 is formed on the inner surface of a cylindrical member 102 formed integral with the lower surface of the dome 14. The ring gear 100 is engaged by the gears 78 and 90 of the gear assemblies 54 and 56, respectively.

As shown in FIG. 4, a plurality of journal bearings, each shown in general by the reference numeral 104, project upwardly from the upper surface of the platform 44 and house shafts 106 which receive the above-mentioned gear-pinion units. In the interest of brevity and for the convenience of presentation, only one gear 74 and its corresponding pinion 76 are shown in FIG. 4 it being understood that the remaining gear-pinion units extend over the shafts 106 and are affixed thereto in any conventional manner to permit rotation of the gear-pinion units relative to the platform 44.

It can be appreciated from the foregoing that rotation of the impeller 40 and, therefore, the spindle 32 imparts a corresponding rotation to the central pinion 60 which in turn drives the gears 62 and 80 of the gear assemblies 54 and 56, respectively. Rotation of the latter gears causes corresponding rotation of the remaining gears in each assembly in a manner to reduce the rotation of the drive gears 78 and 90 relative to that of the impeller and increase the torque applied to the ring gear 100. Since the ring gear 100 is fixed, the latter torque is transmitted to the platform 44 and, therefore, to the valve disc 46. As a result, the valve disc 46 rotates relative to the outlets 28 at a relative low speed but under a relatively high torque.

Referring to FIGS. 2 and 5, there are five outlets 28 spaced at equal angular distances about the vertical axis of the housing. A plurality of exit sleeves 110 extend immediately beneath and register with the outlets 28, respectively, and are adapted for attachment to suitable conduits 112 in a conventional manner for receiving the fluid passing through each outlet and discharging same to an external location.

A plurality of webs 114 extend between each of the sleeves 110 and a boss 116 extending from the base 10, and additional webs 118 extend between adjacent sleeves 110 to impart added structural strength to the assembly.

A valve seat 120 is disposed in each outlet 28 in a press fit and, as shown in FIG. 2, are engaged by the lower surface of the valve disc 46 during rotation of the latter to seal the outlets 28 under conditions to be described in detail later. The valve seats 120 are flared radially outwardly as shown in FIG. 2 to reduce their contact area with the disc 46 and the resultant frictional drag.

The operation of the assembly of the present invention will be described in connection with FIGS. 6 and 7 which show the assembly in two different operative modes. In particular, and referring to FIG. 6, an elongated opening or slot 122 is provided in the valve disc 46. The span of the slot 122 extends for a distance slightly greater than the spacing between the adjacent edges of adjacent outlets 28, as shown in FIG. 6 for reasons to be described in detail later.

In operation, fluid passing into the chamber 24 through the inlet 26 will strike the blades 40a of the impeller 40 and cause the latter to rotate. This, in turn, results in a corresponding rotation of the spindle 32 and the pinion 60 in a direction shown by the arrows in FIG. 6. Rotation of the spindle 60 imparts a corresponding rotational movement to each gear of the gear assemblies 54 and 56, which assemblies operate completely independent of each other. As a result, the output gears 78 and 90 of the gear assemblies 54 and 56, respectively, rotate relative to the fixed ring gear 100 in meshing engagement therewith. This, in turn, imparts a rotational movement to the platform 44 and, therefore, the valve disc 46 at a lower speed than that of the impeller 40. As a result, the valve disc 46 rotates relatively slowly but with a relatively high torque in a counterclockwise direction as viewed in FIG. 6, whereby the slot 122 successively exposes the outlets 28 to permit fluid to pass therethrough, while sealing the remaining portion of the outlets.

Figure 6:
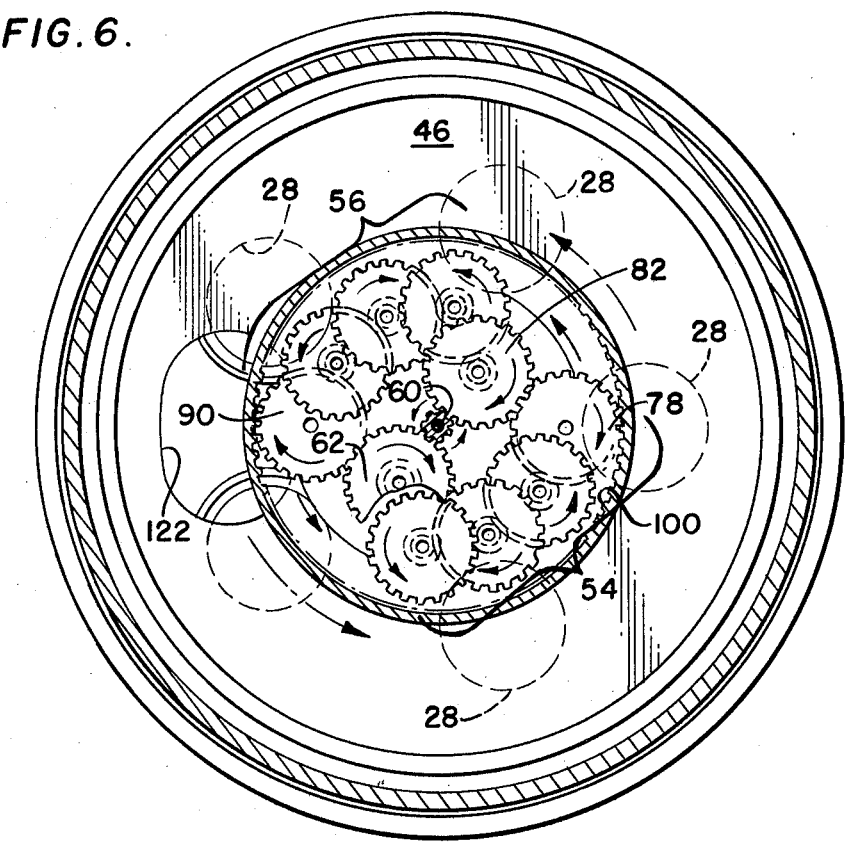
Figure 7:
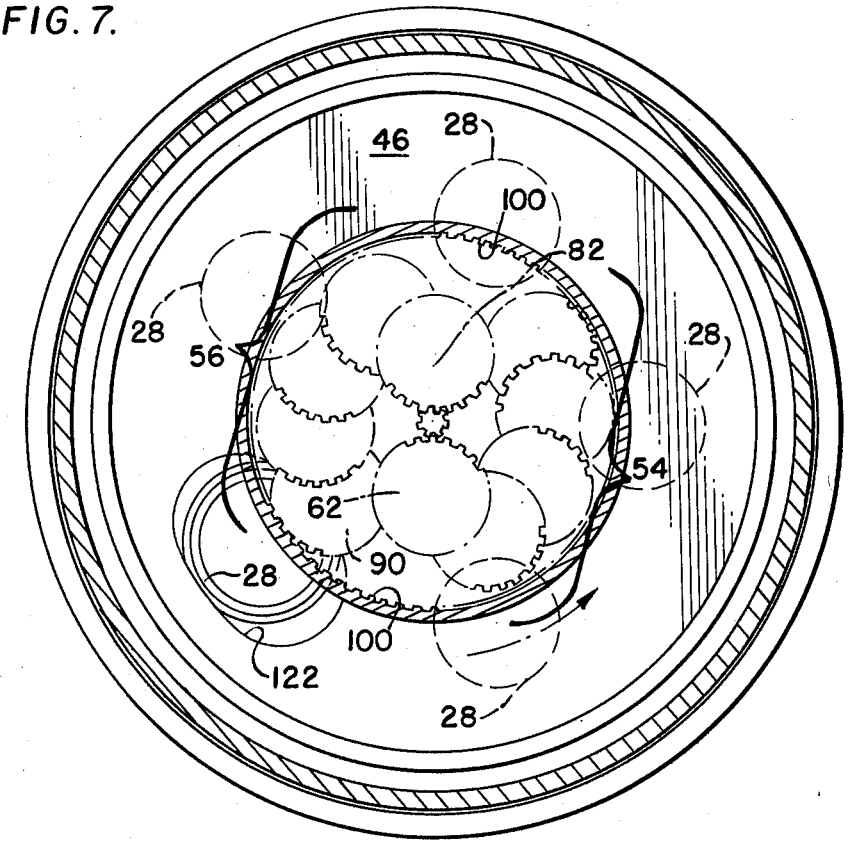
FIG. 7 is a view similar to FIG. 6 but depicting a different operational mode of the assembly of the present invention.

It is noted from FIG. 6 that during the time that the leading edge of the slot 122 is initially moving over one outlet 28 the trailing edge of the slot will remain over a portion of the adjacent, previously opened, outlet so that during a brief period both outlets are open. As the valve disc 46 continues its rotational movement in the counterclockwise direction, the trailing edge of the slot 122 will leave the previously open outlet thus allowing only the newly opened outlet to be opened, as shown in FIG. 7. The latter port will remain open for a period of time as the valve disc 46 continues to move counterclockwise and the cycle is repeated with respect to the next two adjacent outlets 28 and continues to repeat during further rotation of the valve disc.

The aforementioned overlap by the slot 122 of adjacent outlets 28 prevents a high differential pressure condition from occurring which could possibly prevent the valve disc 46 from operating.

Another advantage in the foregoing arrangement is that the flared seats 120 minimize the contact area between the lower surface of the valve disc 46 and the seats. As a result, the valve disc 46 slides over the seats with a minimum of contact thereby minimizing the friction between the two parts. In the latter context since the valve seats 120 are easily replaceable, it is preferred that they be made of a material of a relatively low coefficient of friction, such as Teflon, or the like, while the valve disc 46 can be selected to be of a harder, more durable, material.

A still further advantage of the arrangement of the present invention is that the use of two independent planetary gear systems 54 and 56, with their respective gear-pinion units extending in a diametrically opposed relationship, lessens the driving torque transmitted through a pinions of each gear-pinion unit, and especially the pinions 76 and 98 driving the output gears 78 and 90, respectively, to minimize the failure caused as a result of the relatively high torque being transmitted in these areas.

As mentioned above, a typical use of the valve assembly of the present invention is in connection with pool cleaning in which the conduits 112 attached to the sleeves 110 would be arranged to discharge water around the base or sidewalls of the pool at a plurality of locations for sweeping dirt off the pool walls into suspension in the pool water so that in may be filtered out. However, it is understood that the valve assembly of the present invention is not limited to this particular application but rather can be adapted for other similar uses.

Of course, variations of the specific construction and arrangement of the assembly disclosed above can be made by those skilled in the art without departing from the invention as defined in the appended claims.

We claim:

1. A liquid distributor valve assembly for selectively directing liquid from a source to a plurality of delivery conduits, said system comprising a housing having an inlet for receiving liquid from said source, a plurality of outlets adapted for connection to said conduits, and a chamber communicating said inlet and said outlets; impeller means disposed in said chamber in the path of the liquid entering the housing through said inlet, said impeller means being rotatable in said housing by the force of said liquid; valve means for moving in said chamber in a manner to control the flow of fluid through said outlets; and two gear systems responsive to movement of said impeller means for moving said valve means, said gear systems operating independently of each other to reduce the driving torque applied through each system.

2. The assembly of claim 2, wherein each gear system includes a plurality of gear means, the gear means of one of said gear systems extending diametrically opposite the respective corresponding gear means of the other gear system.

3. The assembly of claim 2, wherein each gear system includes a first gear in driving engagement with said impeller, a second gear rotatably mounted on said valve means and at least one intermediate gear in driving engagement with said first and second gears.

4. The assembly of claim 3, further comprising a stationary ring gear disposed in said chamber in engagement with the second gear of each gear system.

5. The assembly of claim 2, wherein said valve means is in the form of a disc rotatably mounted in said chamber and having at least one opening extending therethrough which is adapted to successively register with said outlets upon rotation of said disc.

6. The assembly of claim 5, further comprising a valve seat extending around each of said outlets, said disc adapted to seat on said valve seats to prevent flow through said outlets.

7. The assembly of claim 6, wherein said valve seats are flared radially outwardly to minimize frictional contact with said disc.

8. The assembly of cliam 5, wherein said disc extends in a spaced relation to the floor of said housing.

9. The assembly of claim 5, wherein said opening in said disc is sized so as to simultaneously register with a portion of two adjacent outlets during rotation of said disc.

* * * * *